(12) United States Patent
Wei

(10) Patent No.: US 7,529,572 B2
(45) Date of Patent: May 5, 2009

(54) MOBILE ELECTRIC DEVICE

(75) Inventor: Hsuan-Wu Wei, Taipei (TW)

(73) Assignee: Asustek Computer Inc., Taipei (TW)

( * ) Notice: Subject to any disclaimer, the term of this patent is extended or adjusted under 35 U.S.C. 154(b) by 544 days.

(21) Appl. No.: 11/435,728

(22) Filed: May 18, 2006

(65) Prior Publication Data

US 2006/0274183 A1 Dec. 7, 2006

(30) Foreign Application Priority Data

Jun. 1, 2005 (TW) .............................. 94118008 A

(51) Int. Cl.
*H04M 1/00* (2006.01)
(52) U.S. Cl. ..................................... 455/575.4; 345/173
(58) Field of Classification Search ............. 455/550.1, 455/566, 575.1, 575.3, 575.4, 90.3, 347, 455/351; 345/172, 173, 174, 175
See application file for complete search history.

(56) References Cited

U.S. PATENT DOCUMENTS

| | | | | |
|---|---|---|---|---|
| 5,920,310 A | * | 7/1999 | Faggin et al. | ................ 345/173 |
| 2005/0052425 A1 | | 3/2005 | Zadesky et al. | |
| 2008/0309637 A1 | * | 12/2008 | Lim et al. | .................... 345/173 |

* cited by examiner

*Primary Examiner*—Thanh C Le
(74) *Attorney, Agent, or Firm*—Birch, Stewart, Kolasch & Birch, LLP

(57) ABSTRACT

A mobile electric device includes a first body, a first touching element and a first sensing element. The first body has a hole passing through the body. The first touching element is disposed in the first body and located on a wall of the hole. The first sensing element located in the first body senses a touch of the first touching element.

20 Claims, 10 Drawing Sheets

MOBILE ELECTRIC DEVICE

BACKGROUND OF THE INVENTION

1. Field of Invention

The invention relates to an electric device, and, in particular, to a mobile electric device.

2. Related Art

Various types of handheld electric devices, such as a personal mobile communication device, a personal digital assistant (PDA) or a digital camera, have been widely used. The user can operate various functions of the handheld electric device through the buttons on the handheld electric device.

As shown in FIG. 1, for example, a personal mobile communication device 1 includes a plurality of buttons 11 and a display 12. The user presses one of the buttons 11 to select functions, so that the personal mobile communication device 1 displays the operation result on the display 12.

Because the operation space of the personal mobile communication device 1 is limited, the design of the buttons 11 becomes more and more small. However, the small buttons 11 are not inconvenient to the user. In addition, because the cursor moves on the display 12 in turn, the user may press the button 11 repeatedly when he or she wants to select the particular function. The operation convenience of the personal mobile communication device 1 may be enhanced if an easier selecting operation may be provided.

Thus, it is a subject of the invention to provide a simple input means to take the place of the buttons so as to enhance the operational convenience for a mobile electric device.

SUMMARY OF THE INVENTION

To achieve the above, the invention provides a mobile electric device, and its operation is convenient to users.

The invention provides a mobile electric device including a first body, a first touching element and a first sensing element. The first body has a hole passing through the first body. The first touching element is disposed in the first body and located on the wall of the hole. The first sensing element disposed in the first body senses a touch of the first touching element.

As mentioned hereinabove, because the mobile electric device of the invention has the first touching element, which is disposed in the body and located on the wall of the hole, and the first sensing element, which senses a touch of the first touching element, it is possible to provide an easy input means to take the place of the buttons, and the operation convenience of the mobile electric device may be enhanced.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

Figure 1:
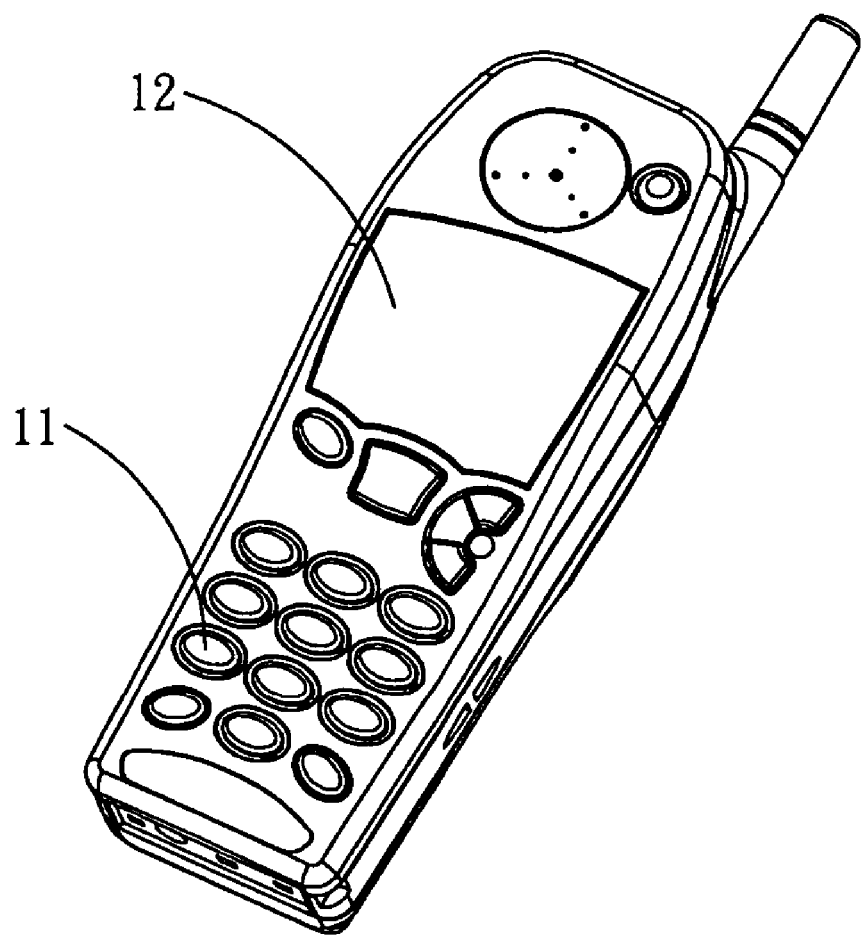
FIG. 1 is a schematic illustration showing a conventional hand-held mobile communication device.
Figure 2:
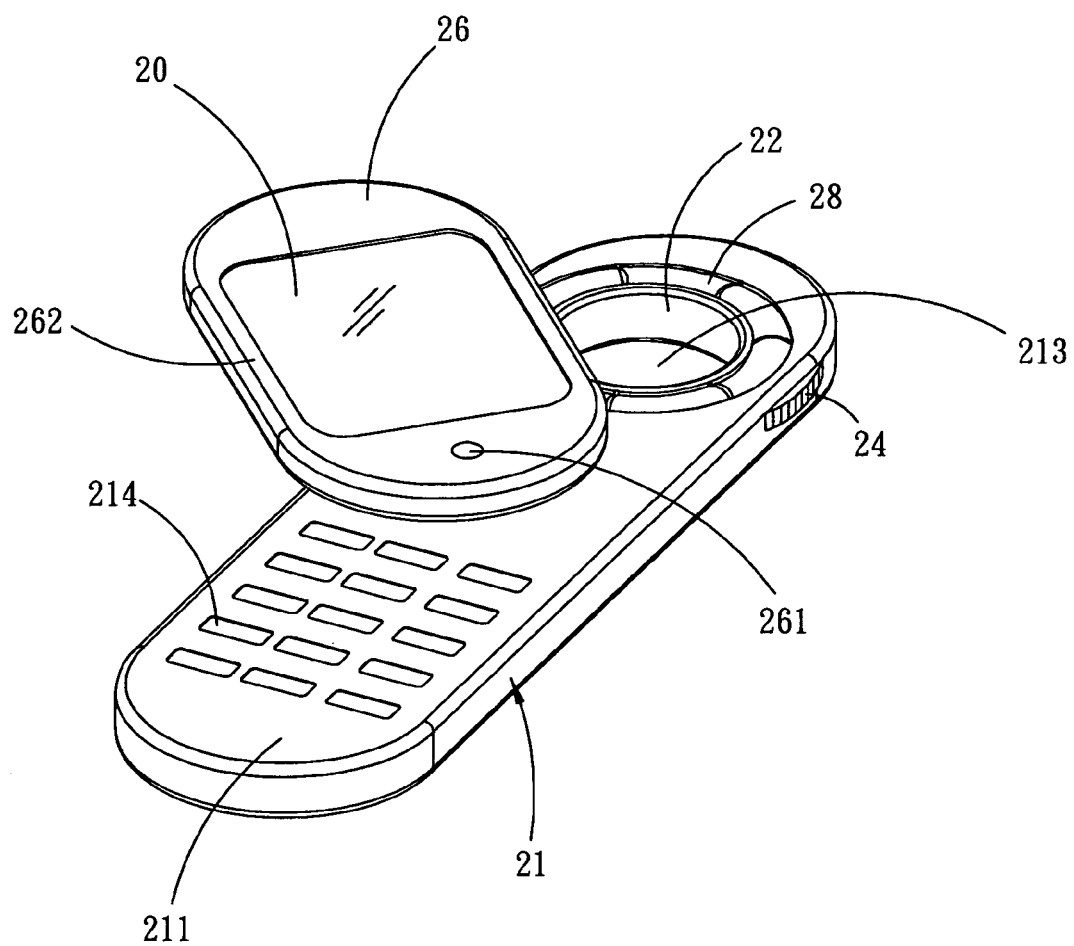
FIG. 2 is a schematic illustration showing a mobile electric device according to a preferred embodiment of the invention.
Figure 3:
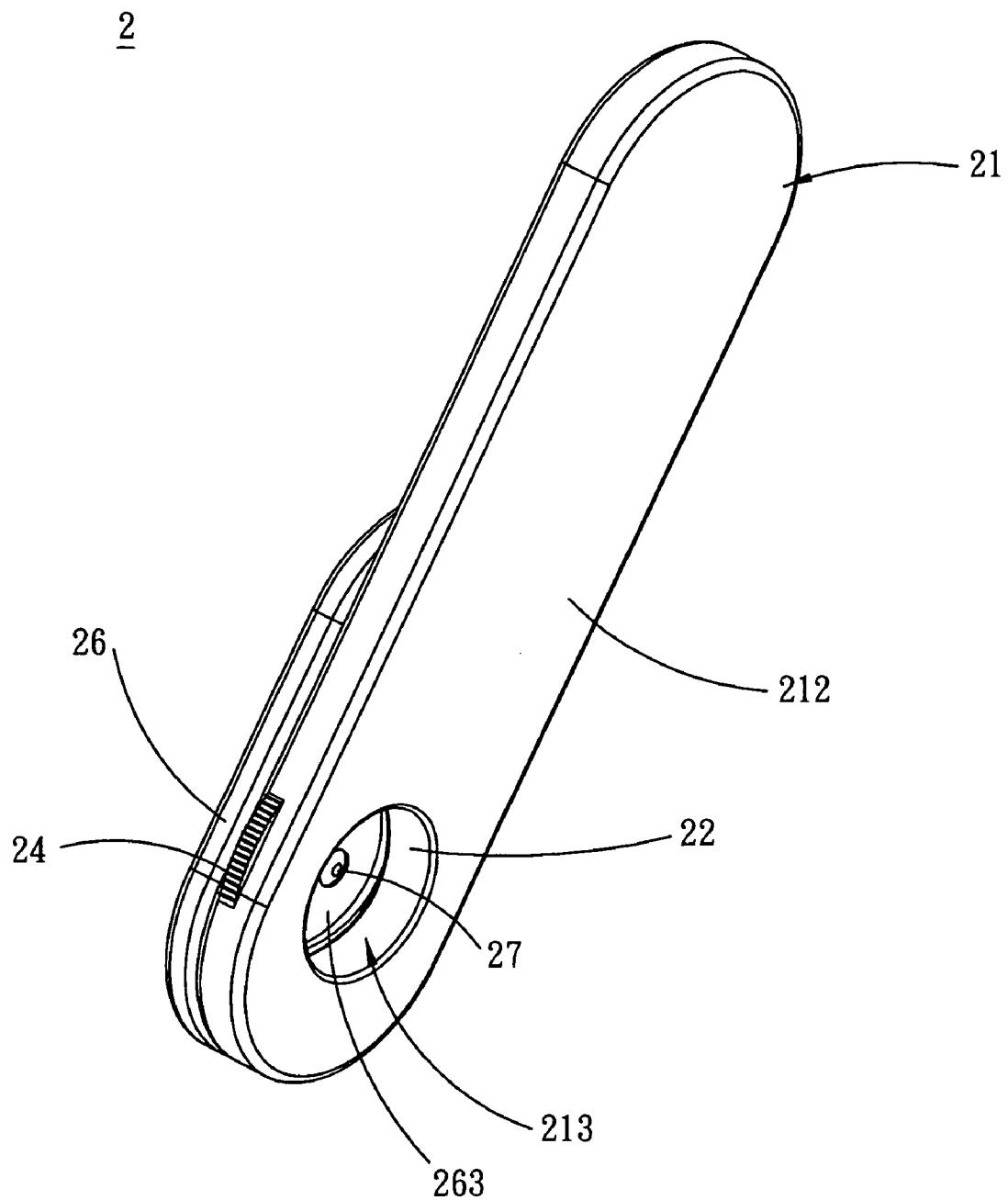
FIG. 3 is a schematic illustration showing the mobile electric device according to the preferred embodiment of the invention, wherein a lens is mounted on a second surface.
Figures 4A, 4B:
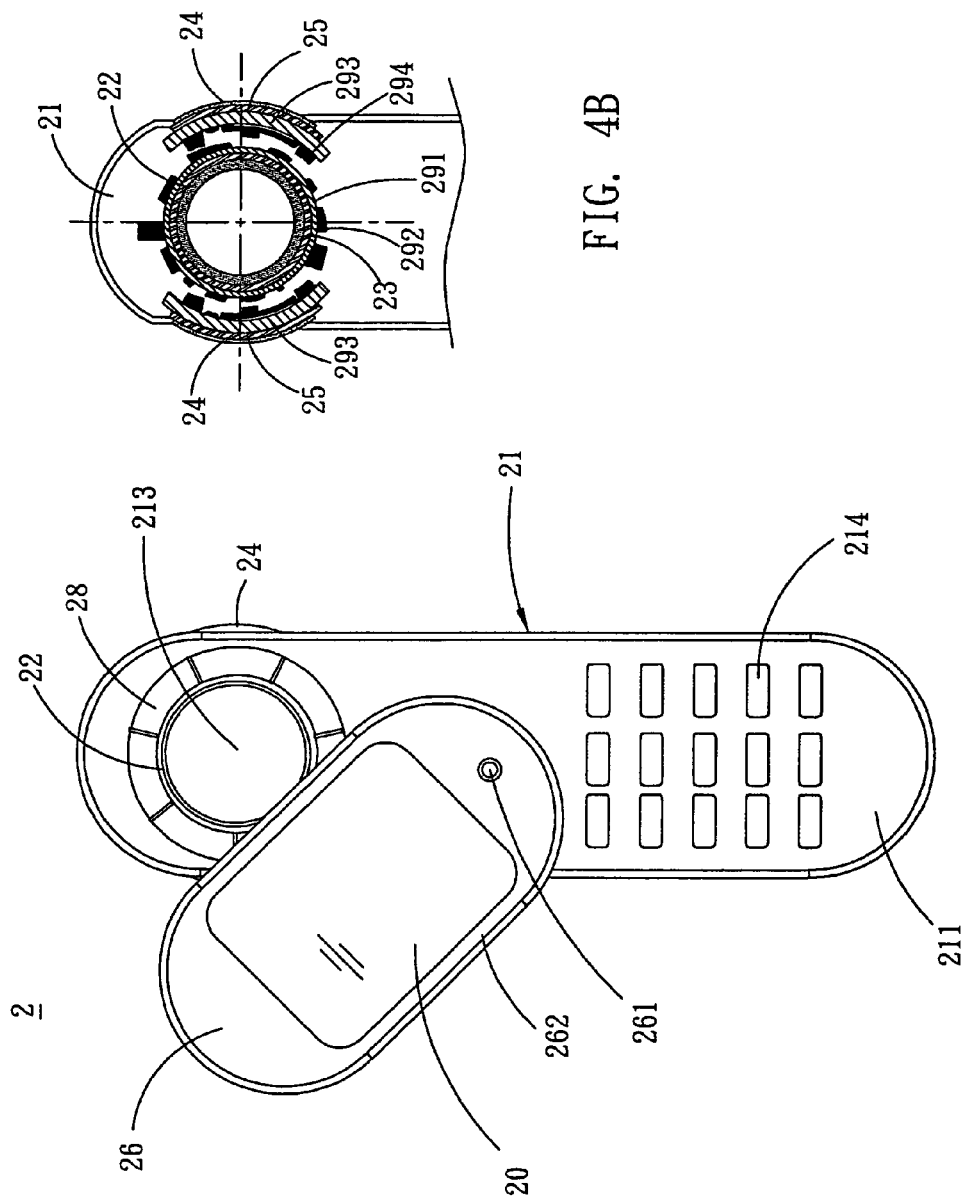
FIG. 4A is a schematic illustration showing the mobile electric device according to the preferred embodiment of the invention, wherein the first sensing element is a touch panel.
FIG. 4B is a schematic illustration showing an inner structure of the mobile electric device according to the preferred embodiment of the invention, wherein the first sensing element is a touch panel.

The present invention will be apparent from the following detailed description, which proceeds with reference to the accompanying drawings, wherein the same references relate to the same elements.

For the sake of convenience, the mobile electric device will be described with reference, without limitation, to an example of a hand-held wireless communication device.

Referring to FIGS. 2, 3, 4A and 4B, a mobile electric device 2 according to a preferred embodiment of the invention includes a first body 21, a first touching element 22 and a first sensing element 23. The first body 21 has a first surface 211, a second surface 212 and a hole 213 passing through the first surface 211 and the second surface 212. The first touching element 22 is disposed in the first body 21 and located on a wall of the hole 213. The first sensing element 23, which is disposed in the first body 21 and in contact with the first touching element 22, senses a touch of the first touching element 22.

The first sensing element 23 senses the touch of the first touching element 22 and thus generates a touch signal. The mobile electric device 2 can generate an action/a function corresponding to the touch signal. In this embodiment, the first touching element 22 may be a plastic film, the first sensing element 23 may be a touch panel, and the first sensing element 23 senses an action of the user of pressing the first touching element 22 and thus generates the touch signal. In addition, the first touching element 22 may have a ring shape such that the user can conveniently sweep his/her finger across the first touching element 22 with the finger contacting the first touching element 22.

The mobile electric device 2 may include a first circuit board 291 and a plurality of first electric elements 292. The first circuit board 291 and the first electric elements 292 are mounted in the first body 21. The first circuit board 291 is disposed between the first sensing element 23 and the first electric elements 292. The first circuit board 291 and the first electric elements 292 can process the touch signal generated by the first sensing element 23.

On the other hand, the mobile electric device 2 further includes a second touching element 24, a second sensing element 25, a second circuit board 293 and a plurality of second electric elements 294.

The second touching element 24 is disposed in the first body 21. The second sensing element 25, which is disposed in the first body 21 and in contact with the second touching element 24, senses a touch of the second touching element 24. The second circuit board 293 and the second electric elements 294 are mounted in the first body 21. The second circuit board 293 is disposed between the second sensing element 25 and the second electric elements 294. The second circuit board 293 and the second electric elements 294 can process the touch signal generated by the second sensing element 25.

In this embodiment, the second touching element 24 may be a plastic film, the second sensing element 25 may be a touch panel, and the second sensing element 25 is pressed by the second touching element 24 to generate another touch signal. In addition, the first touching element 22 or the second touching element 24 may have various shapes such as a ring shape, a circular shape, an arc shape, a rectangular shape according to the requirement of the user in order to facilitate the operation of the user.

The first body 21 further includes a plurality of buttons 214 mounted on the first surface 211 such that the user can also input messages or operate the mobile electric device 2 through the buttons 214.

The mobile electric device 2 further includes a second body 26, an image acquiring unit 27, an input unit 28 and a display module 20. The second body 26 is pivotally mounted on the first surface 211 of the first body 21 through an axle 261. So, the second body 26 can be rotated about the axle 261. The display module 20 is mounted on a first surface 262 of the second body 26.

The image acquiring unit 27 is mounted on a second surface 263 of the second body 26 such that the user can take photos by the image acquiring unit 27. The first surface 262 of the second body 26 and the second surface 263 of the second body 26 are disposed at opposite sides. The input unit 28 is disposed on the first surface 211 of the first body 21 and mounted around the hole 213. The user can also input messages or operate the mobile electric device 2 through the input unit 28.

In addition, the mobile electric device 2 includes a control unit (not shown) for controlling an action/a function corresponding to the touch of the first touching element 22 and enabling the display module 20 to display a frame corresponding to the touch of the first touching element 22 according to the touch of the first touching element 22 sensed by the first sensing element 23.

For example, the user sweeps his/her finger across the surface of the first touching element 22 or the second touching element 24, and the first sensing element 23 or second sensing element 25 senses a touch of the first touching element 22 or the second touching element 24 to generate the touch signal, which corresponds to a signal generated after the user has pressed a direction button among the buttons 214. The control unit can select an address book or an operation function according to the touch signal, and the display module 20 can display the selecting procedure.

In addition, if the user only presses the first touching element 22 or the second touching element 24, the first sensing element 23 or the second sensing element 25 senses the touch of the first touching element 22 or the second touching element 24 and thus generates the touch signal, which corresponds to a signal generated after the user has pressed a verification button among the buttons 214. The control unit can perform the function selected by the user or dial the selected telephone number according to the touch signal.

Figure 5:
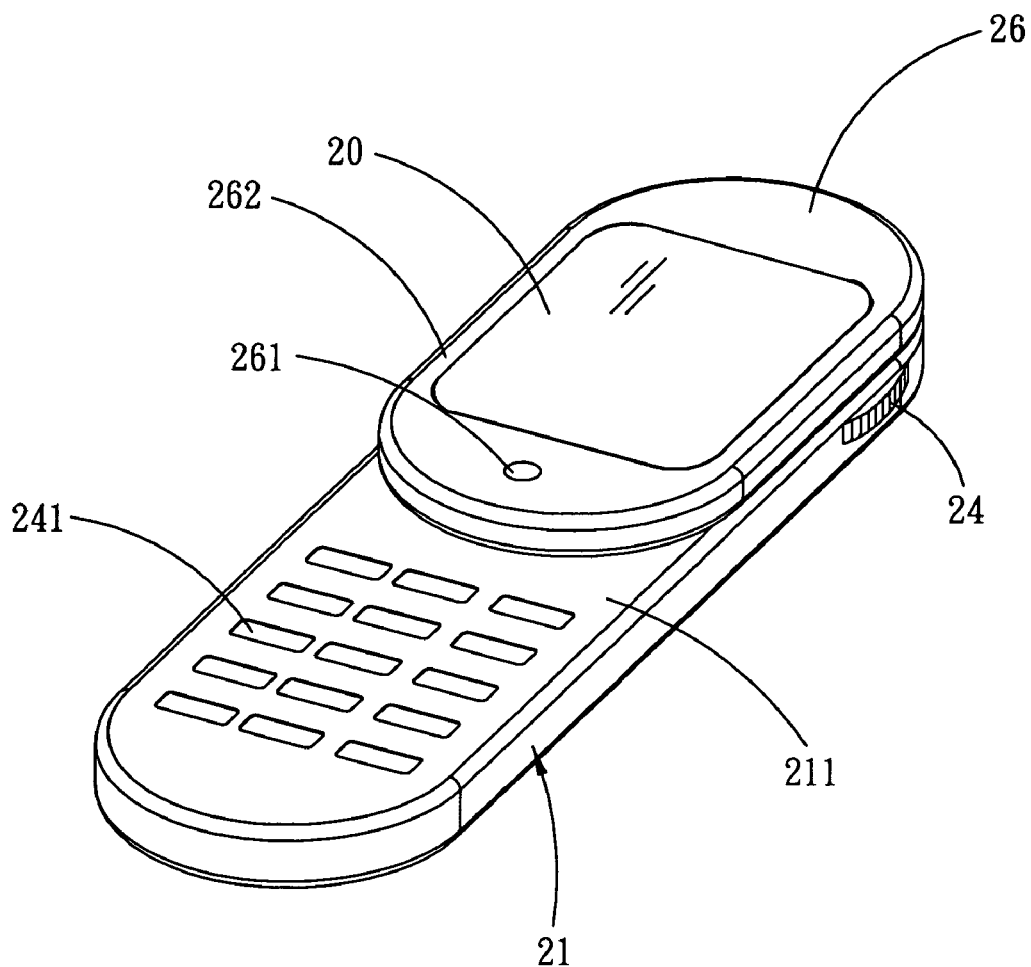
FIG. 5 is a schematic illustration showing the mobile electric device according to the preferred embodiment of the invention, wherein a display element covers the hole.

As shown in FIG. 5, the second body 26 can cover the hole 213, and the user can operate the mobile electric device 2 through the buttons 214 in a manner of using a mobile phone.

Figure 6:
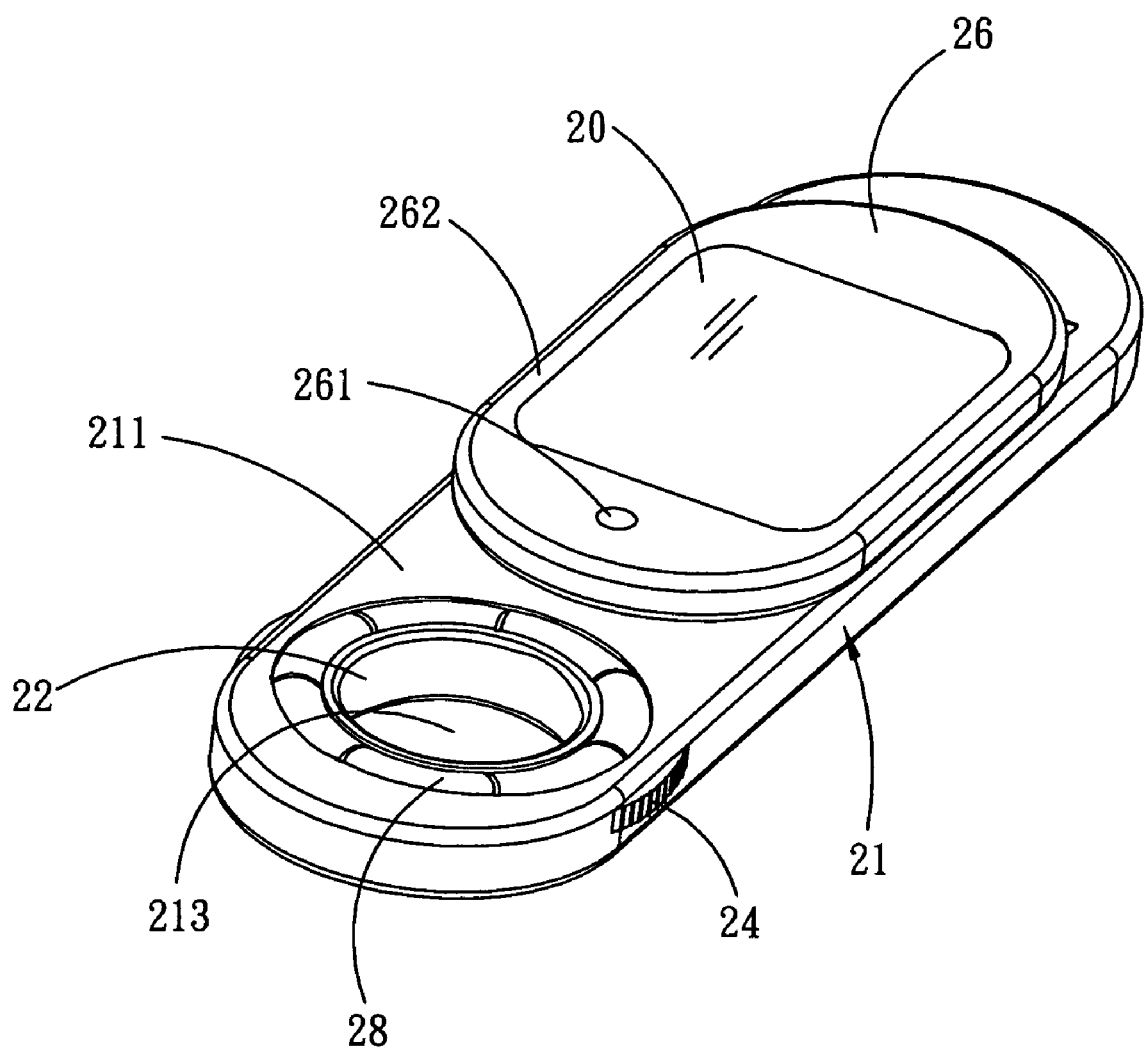
FIG. 6 is a schematic illustration showing the mobile electric device according to the preferred embodiment of the invention, wherein the display element covers the buttons.

As shown in FIG. 6, the second body 26 can cover the buttons 214, and the user can operate the mobile electric device 2 through the first touching element 22 and the second touching element 24. In addition, because the buttons 214 have been covered, the user cannot touch the buttons 214.

Figure 7:
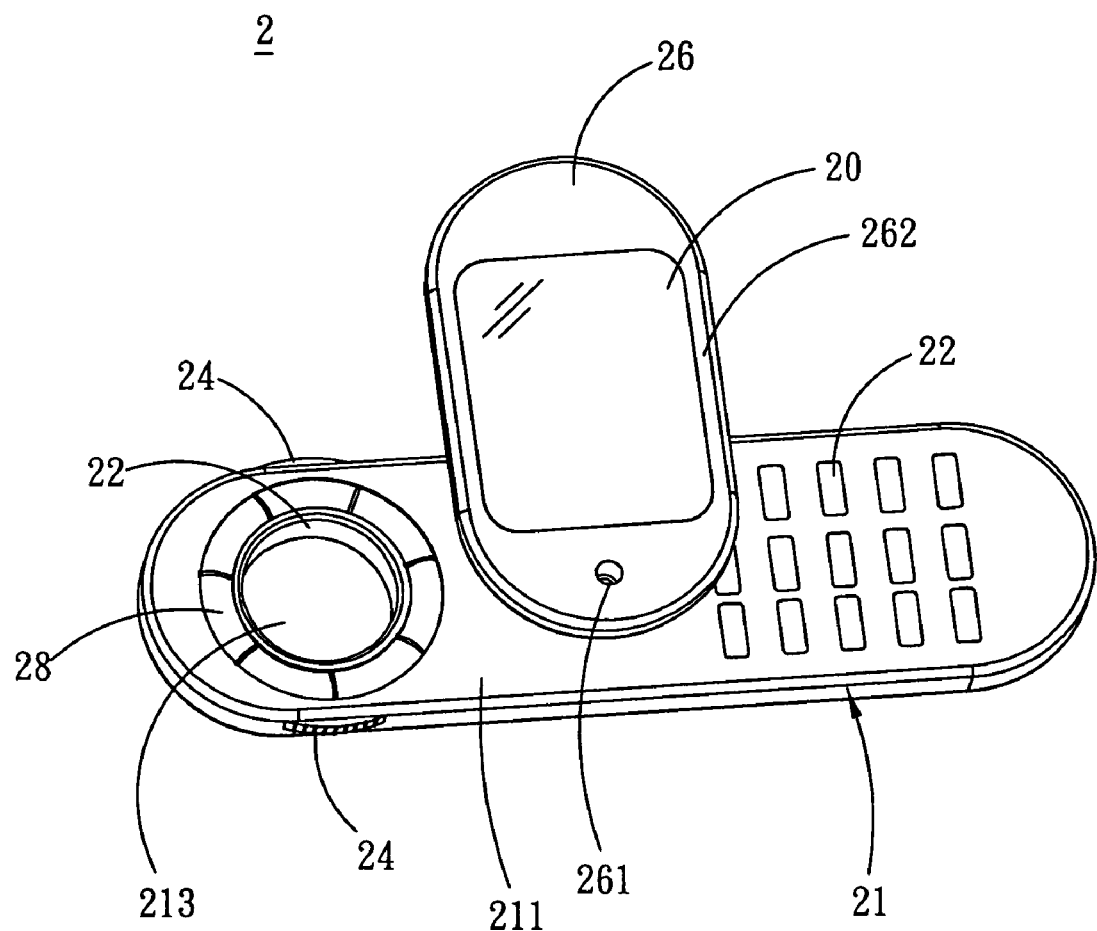
FIG. 7 is a schematic illustration showing the mobile electric device according to the preferred embodiment of the invention, wherein the display element is perpendicular to the body.
Figure 8:
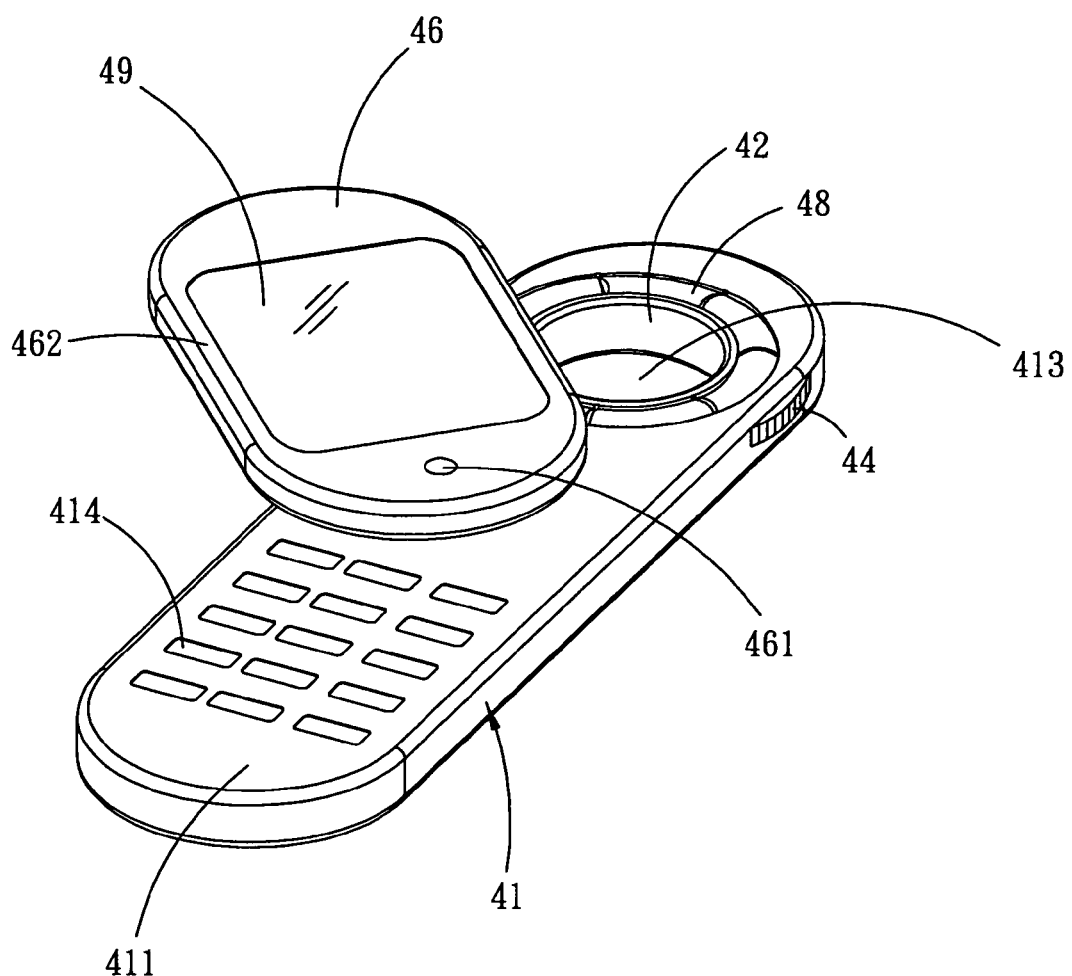
FIG. 8 is a schematic illustration showing a mobile electric device according to another preferred embodiment of the invention, wherein the first touching element is a roller.
Figure 9:
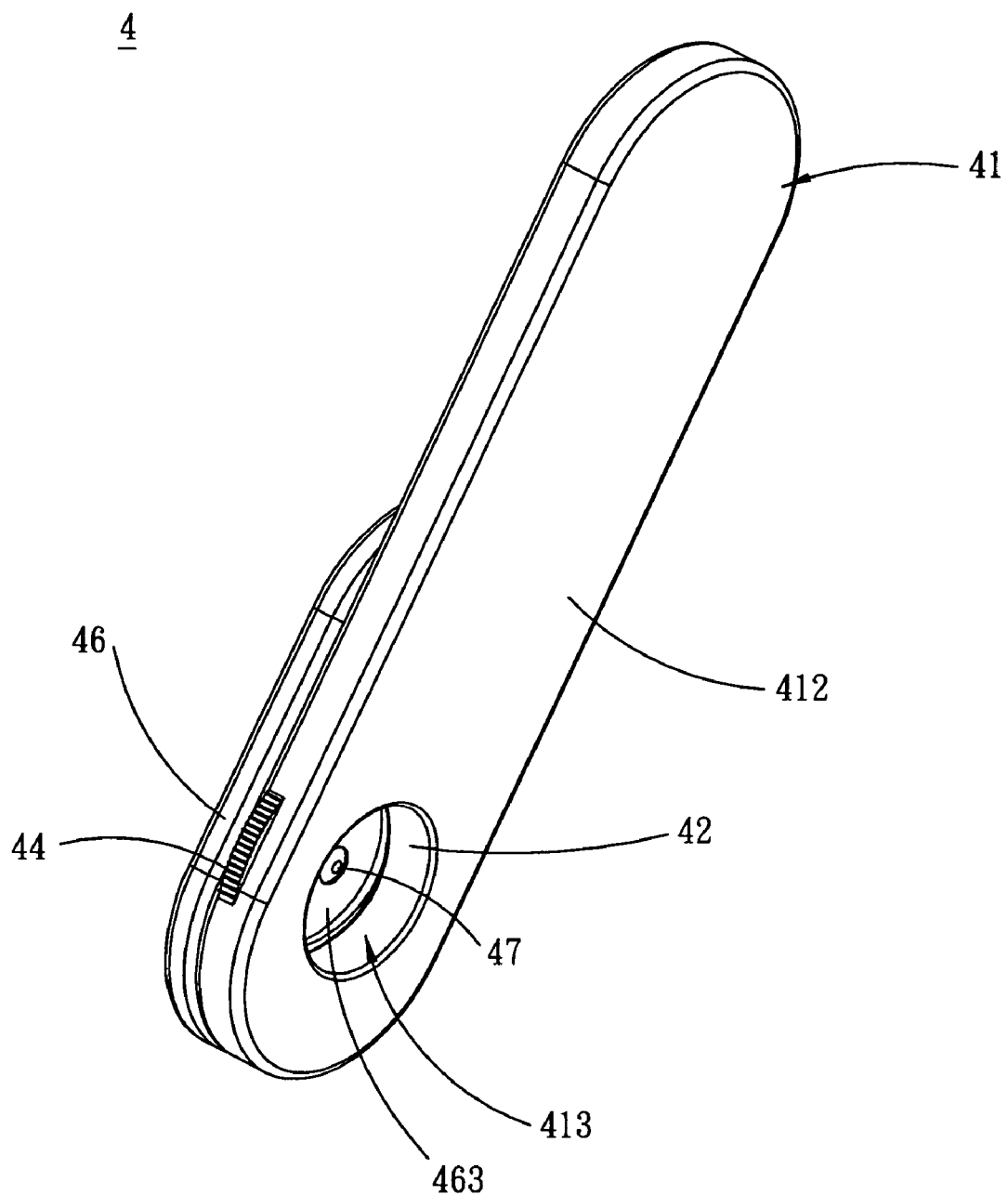
FIG. 9 is a schematic illustration showing the mobile electric device according to another preferred embodiment of the invention, wherein the first touching element is a roller and the lens is mounted on the second surface.
Figure 10B:
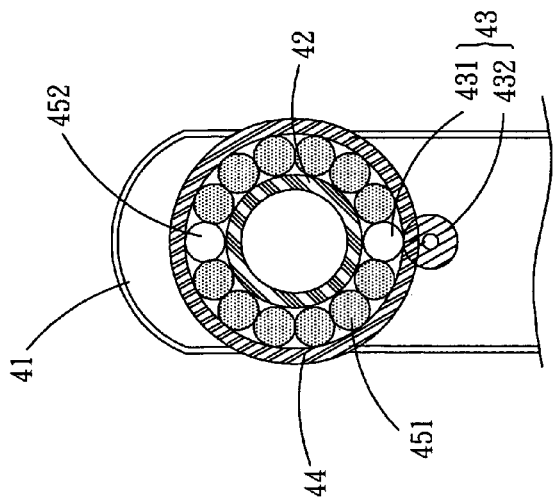
FIG. 10B is a schematic illustration showing an inner structure of the mobile electric device according to another preferred embodiment of the invention, wherein the first sensing element is a friction roller.
Figure 10A:
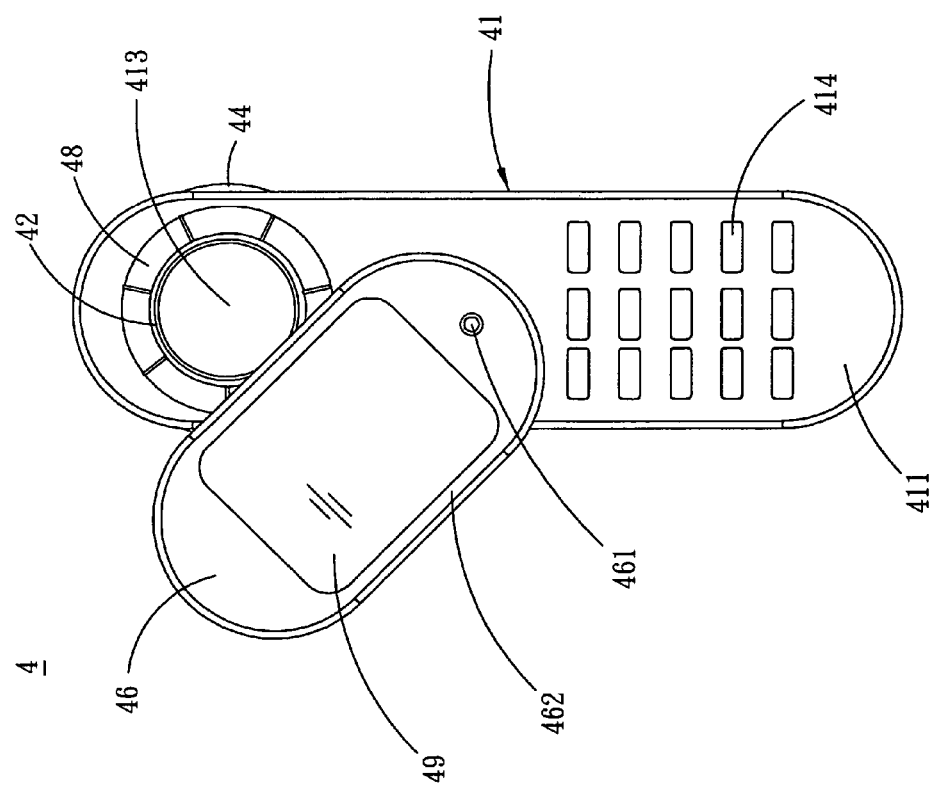
FIG. 10A is a schematic illustration showing the mobile electric device according to another preferred embodiment of the invention, wherein the first sensing element is a friction roller.

As shown in FIG. 7, the second body 26 may be rotated into a state perpendicular to the first body 21. At this time, the user can operate the mobile electric device 2 through the first touching element 22, the second touching element 24 and the buttons 214. In addition, the user may also play the game software installed in the mobile electric device 2.

In this embodiment, the mobile electric device may be a hand-held wireless communication device, a personal digital assistant device or a digital camera.

In addition, the mobile electric device can sense the message generated after the user touches the first touching element or the second touching element in an electric manner or a mechanical manner, which will be described in the following.

Referring to FIGS. 8, 9, 10A and 10B, a mobile electric device 4 according to another preferred embodiment of the invention includes a first body 41, a first touching element 42 and a first sensing element 43.

The first body 41 has a first surface 411, a second surface 412 and a hole 413 passing through the first surface 411 and the second surface 412. The first touching element 42 is disposed in the first body 41 and located on a wall of the hole 413.

The first sensing element 43 includes a first sensing portion 431 and a second sensing portion 432, both of which are disposed in the first body 41. The first sensing portion 431 is disposed between the second sensing portion 432 and the first touching element 42 and respectively in contact with the second sensing portion 432 and the first touching element 42. The first sensing portion 431 and the second sensing portion 432 sense a touch of the first touching element 42.

The first touching element 42 may be a rotatable wheel. The first sensing portion 431 and the second sensing portion 432 may be friction rollers. When the first touching element 42 is touched and rotated, the first sensing portion 431 rotates with the rotation of the first touching element 42, and the second sensing portion 432 rotates with the rotation of the first sensing portion 431. Thus, the second sensing portion 432 can sense the rotation or movement of the first touching element 42.

In addition, the mobile electric device 4 includes a second touching element 44, a plurality of rollers 451 and a positioning axle 452. The second touching element 44 is disposed in the first body 41 and in contact with the first sensing portion 431. The rollers 451 are disposed between the first touching element 42 and the second touching element 44. The rollers 451, the first touching element 42 and the second touching element 44 may constitute a bearing. The rollers 451 may be cylindrical rollers.

The positioning axle 452 and the first sensing portion 431 are disposed between the first touching element 42 and the second touching element 44 and are connected to the first body 41, such that the first touching element 42 and the second touching element 44 are mounted on the first body 41.

In this embodiment, the second touching element 44 may be a friction roller. When the second touching element 44 is touched and rotated, the first sensing portion 431 rotates with the rotation of the second touching element 44, and the second sensing portion 432 rotates with the rotation of the first sensing portion 431. So, the second sensing portion 432 can sense the rotation or movement of the second touching element 44.

The first body 41 further includes a plurality of buttons 414 mounted on the first surface 411 such that the user can input messages or operate the mobile electric device 4 through the buttons 414.

The mobile electric device 4 further includes a second body 46, an image acquiring unit 47, an input unit 48 and a display module 49.

The second body 46 is pivotally mounted on the first surface 411 of the first body 41 through an axle 461. So, the second body 46 can be rotated about the axle 461. The display module 49 is mounted on a first surface 462 of the second body 46.

The image acquiring unit 47 is mounted on a second surface 463 of the second body 46 such that the user can take photos by using the image acquiring unit 47. Herein, the first surface 462 of the second body 46 and the second surface 463 of the second body 46 are disposed at opposite sides. The input unit 48 is disposed on the first surface 411 and mounted around the hole 413. The user can input messages or operate the mobile electric device 4 by the input unit 48.

The operational property, functional variations or other aspects of the mobile electric device of this embodiment have been discussed in the embodiment shown in FIGS. 2 to 7. So, detailed descriptions thereof will be omitted.

As mentioned hereinabove, because the mobile electric device of the invention has the first touching element, which is disposed in the body and located on the wall of the hole, and the first sensing element, which senses the touch of the first touching element, it is possible to provide an easy input means to take the place of the buttons, and the operation convenience of the mobile electric device may be enhanced.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A mobile electric device, comprising:
   a first body, which has a hole passing through the first body;
   a first touching element, which is disposed in the first body and located on the wall of the hole; and
   a first sensing element, which is disposed in the first body, for sensing a touch of the first touching element.

2. The mobile electric device according to claim 1, wherein the first sensing element contacts the first touching element to sense a touch signal, which is generated when the first touching element encounters the touch.

3. The mobile electric device according to claim 1, wherein the first touching element has a ring shape.

4. The mobile electric device according to claim 1, wherein the first touching element is a rotatable wheel.

5. The mobile electric device according to claim 1, wherein the first touching element is a plastic film.

6. The mobile electric device according to claim 1, wherein the first sensing element is a friction roller.

7. The mobile electric device according to claim 1, wherein the first sensing element is a touch panel.

8. The mobile electric device according to claim 1, further comprising:
   a second touching element disposed in the first body.

9. The mobile electric device according to claim 8, wherein the second touching element is a rotatable wheel.

10. The mobile electric device according to claim 8, wherein the second touching element is a plastic film.

11. The mobile electric device according to claim 8, further comprising:
    a bearing disposed between the first touching element and the second touching element.

12. The mobile electric device according to claim 11, wherein the bearing has cylindrical rollers.

13. The mobile electric device according to claim 8, further comprising:
    a second sensing element, which is disposed in the first body, for sensing the touch of the second touching element.

14. The mobile electric device according to claim 13, wherein the second sensing element is a touch panel.

15. The mobile electric device according to claim 8, wherein the first sensing element senses the touch of the second touching element.

16. The mobile electric device according to claim 1, further comprising:
    a second body, which is pivotally mounted on the surface of the first body; and
    a display module, which is mounted on a first surface of the second body.

17. The mobile electric device according to claim 16, further comprising:
    a control unit for controlling the mobile electric device to generate an action corresponding to the touch of the first touching element and to enable the display module to display a frame corresponding to the touch of the first touching element.

18. The mobile electric device according to claim 16, further comprising:
    an image acquiring unit mounted on a second surface of the second body, which is opposite to the first surface of the second body.

19. The mobile electric device according to claim 1, further comprising:
    at least one input unit disposed on the first surface and around the hole.

20. The mobile electric device according to claim 1, wherein the mobile electric device is a wireless communication device, a personal digital assistant device or a digital camera.

* * * * *